(12) United States Patent
Maeda

(10) Patent No.: US 8,517,154 B2
(45) Date of Patent: Aug. 27, 2013

(54) SHOCK ABSORBER

(75) Inventor: Atsushi Maeda, Fujisawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 10 days.

(21) Appl. No.: 13/032,992

(22) Filed: Feb. 23, 2011

(65) Prior Publication Data

US 2011/0209956 A1 Sep. 1, 2011

(30) Foreign Application Priority Data

Feb. 26, 2010 (JP) .................................. 2010-42473

(51) Int. Cl.
*F16F 9/34* (2006.01)

(52) U.S. Cl.
USPC ..................... 188/322.15; 188/313

(58) Field of Classification Search
USPC ................. 188/297, 313, 314, 315, 316, 317, 188/322.13, 322.15, 322.22
See application file for complete search history.

(56) References Cited

U.S. PATENT DOCUMENTS

| | | | | |
|---|---|---|---|---|
| 3,747,714 A | * | 7/1973 | DeCarbon | 188/317 |
| 4,972,929 A | * | 11/1990 | Ivers et al. | 188/322.15 |
| 5,709,290 A | * | 1/1998 | Ekert et al. | 188/322.15 |
| 6,247,563 B1 | * | 6/2001 | De Carbon et al. | 188/282.5 |
| 2005/0263363 A1 | | 12/2005 | Katou et al. | |

FOREIGN PATENT DOCUMENTS

JP 2006-10069 1/2006

* cited by examiner

*Primary Examiner* — Robert A Siconolfi
*Assistant Examiner* — Vu Q Nguyen
(74) *Attorney, Agent, or Firm* — Wenderoth, Lind & Ponack, LLP

(57) ABSTRACT

A piston connected to a piston rod is fitted in a cylinder having a hydraulic oil sealed therein. Flows of hydraulic oil induced in extension and compression passages and by sliding movement of the piston are controlled by extension and compression damping force generating mechanisms, respectively, to generate damping force. In the extension and compression damping force generating mechanisms, the hydraulic oil is introduced into back pressure chambers through back pressure introducing passages, respectively, and the opening of relief valves is controlled by the pressures in the back pressure chambers, respectively. The inner peripheral portions of the relief valves are supported from their rear sides by support members to provide gaps on the front sides of the relief valves, respectively. When the relief valves open, their inner peripheral edge portions move within the gaps pivotally about the support members as fulcrums, respectively.

16 Claims, 5 Drawing Sheets

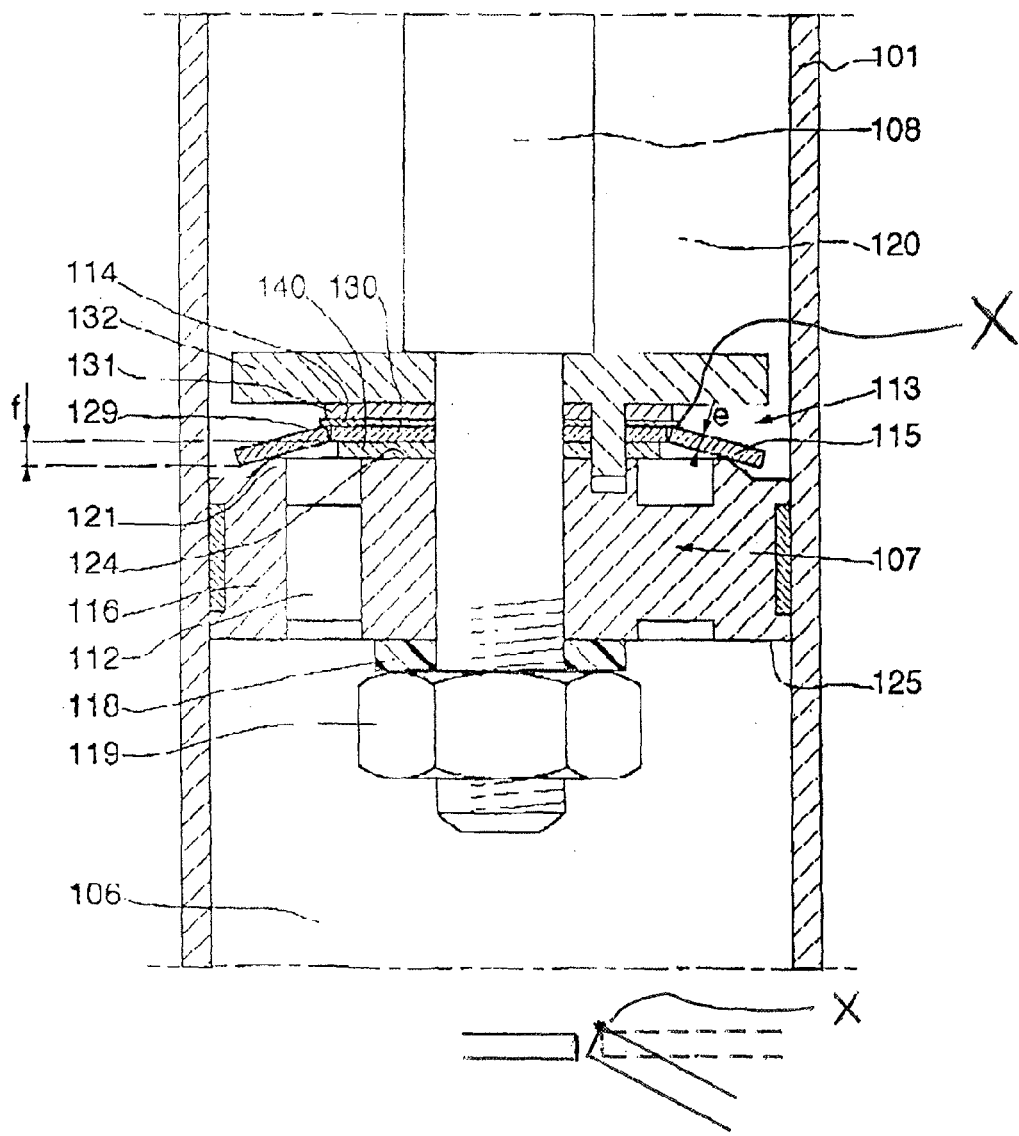
FIG.3 (Annotated)

SHOCK ABSORBER

BACKGROUND OF THE INVENTION

The present invention relates to shock absorbers such as hydraulic shock absorbers that generate a damping force by controlling the flow of a hydraulic fluid in relation to the stroke of a piston rod.

Hydraulic shock absorbers attached to the suspension systems of vehicles, for example, are desired to have optimal damping force characteristics in order to improve ride quality and steering stability. In general, this type of hydraulic shock absorber has a piston connected to a piston rod and slidably fitted in a cylinder having a hydraulic fluid therein. A stroke of the piston rod causes sliding movement of the piston in the cylinder, which in turn induces a flow of hydraulic fluid. The hydraulic fluid flow is controlled by a damping force generating mechanism, which comprises an orifice, a disk valve, etc., to generate a damping force, and the damping force characteristics are adjusted on the basis of the flow path area of the orifice, the valve opening characteristics of the disk valve, and so forth.

A hydraulic shock absorber disclosed in Japanese Patent Publication No. 2006-10069 has a back pressure chamber and a main valve at the back of the disk valve of the damping force generating mechanism. The main valve relieves the pressure in the back pressure chamber to the downstream side. A part of the hydraulic fluid is introduced into the back pressure chamber, and the pressure in the back pressure chamber is applied to the disk valve in the direction for closing the disk valve, thereby adjusting the valve opening pressure of the disk valve, and thus increasing the degree of freedom for setting damping force characteristics.

SUMMARY OF THE INVENTION

An object of the present invention is to provide a shock absorber increased in the degree of freedom for setting damping force characteristics to obtain desired damping force characteristics.

To solve the above-described problem, the present invention provides a shock absorber including a cylinder having a hydraulic fluid sealed therein, a piston slidably fitted in the cylinder, a piston rod connected to the piston and extending to the outside of the cylinder, a passage through which a flow of hydraulic fluid is induced by movement of the piston, a relief valve restricting the flow of hydraulic fluid through the passage, a back pressure chamber applying the pressure therein to the relief valve in a direction for closing the relief valve, and a back pressure introducing passage introducing the hydraulic fluid into the back pressure chamber. The relief valve is an annular disk valve having an opening at an inner side thereof. The relief valve has a front side and a rear side. The back pressure chamber is disposed at the rear side of the relief valve. The relief valve has an outer peripheral portion provided on the front side thereof. The outer peripheral portion unseats from and seats on a valve seat to open and close, respectively, the relief valve. The relief valve further has an inner peripheral portion supported from the rear side by a support member, and an inner peripheral edge portion adjacent to the opening at the inner side. When the outer peripheral portion of the relief valve seats on the valve seat to close the relief valve, a gap is provided between the front side of the relief valve and a retaining member retaining the support member. When the outer peripheral portion of the relief valve unseats from the valve seat to open the relief valve, the inner peripheral edge portion moves within the gap pivotally about the support member as a fulcrum.

The relief valve may have an elastic seal member integrally fixed to an outer peripheral portion of the rear side to seal the back pressure chamber.

The support member may be provided with the back pressure introducing passage.

The rear side of the relief valve may be provided with a spring member urging the relief valve in the direction for closing the relief valve.

The shock absorber may further comprising:
a valve member having a shape of a circular cylinder, one end of which is closed, the valve member defining the back pressure chamber;
the retaining member being fitted to the valve member, with the relief valve and the support member incorporated in the valve member, to form a subassembly.

The back pressure chamber may be provided with a damping valve opened by the pressure in the back pressure chamber to generate a damping force by controlling a flow of the hydraulic fluid toward a downstream chamber.

DETAILED DESCRIPTION OF THE INVENTION

Embodiments of the present invention will be explained below in detail with reference to the accompanying drawings.

Figure 1:
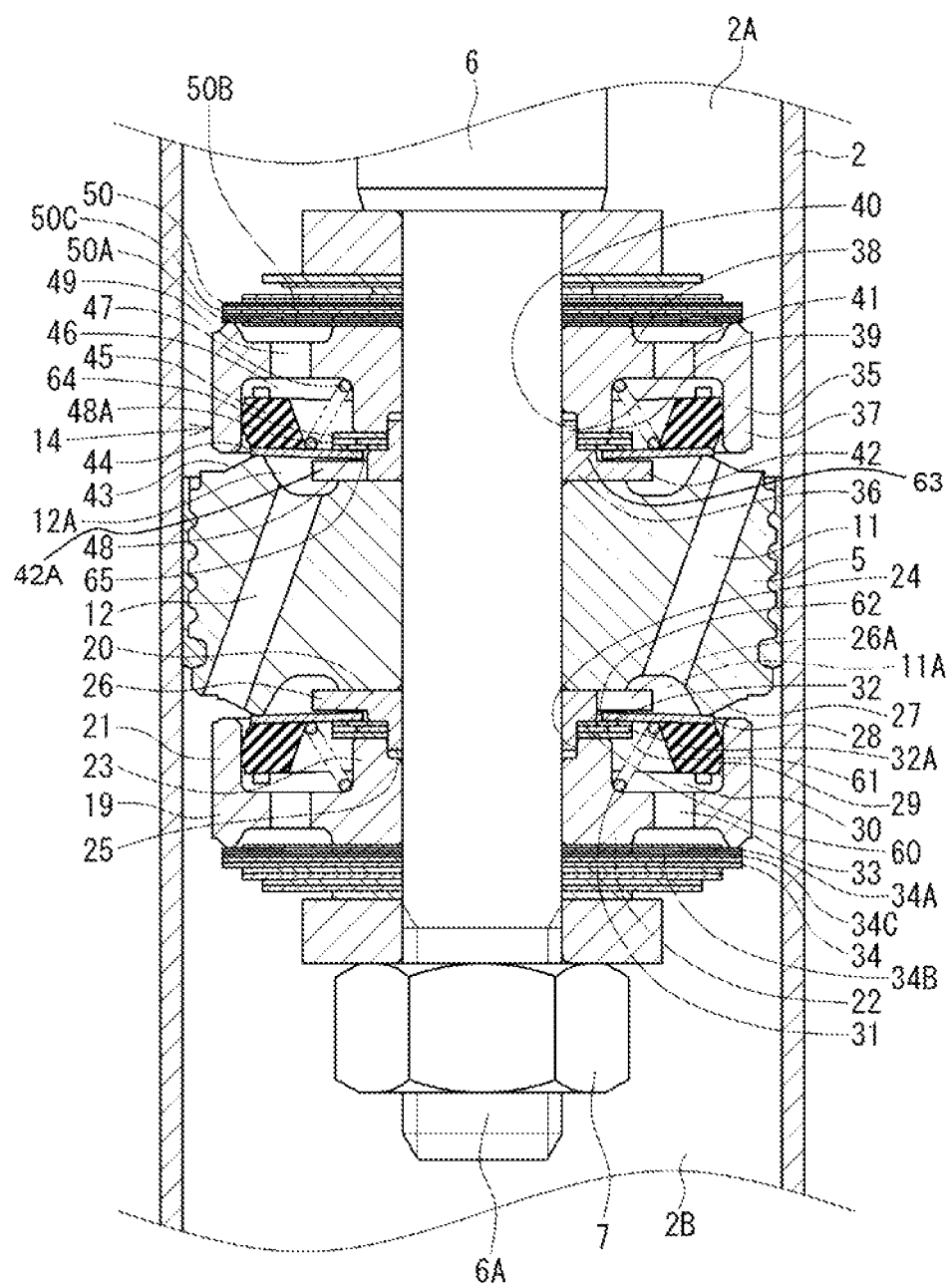
FIG. 1 is an enlarged vertical sectional view showing a main part of a shock absorber according to a first embodiment of the present invention.
Figure 2:
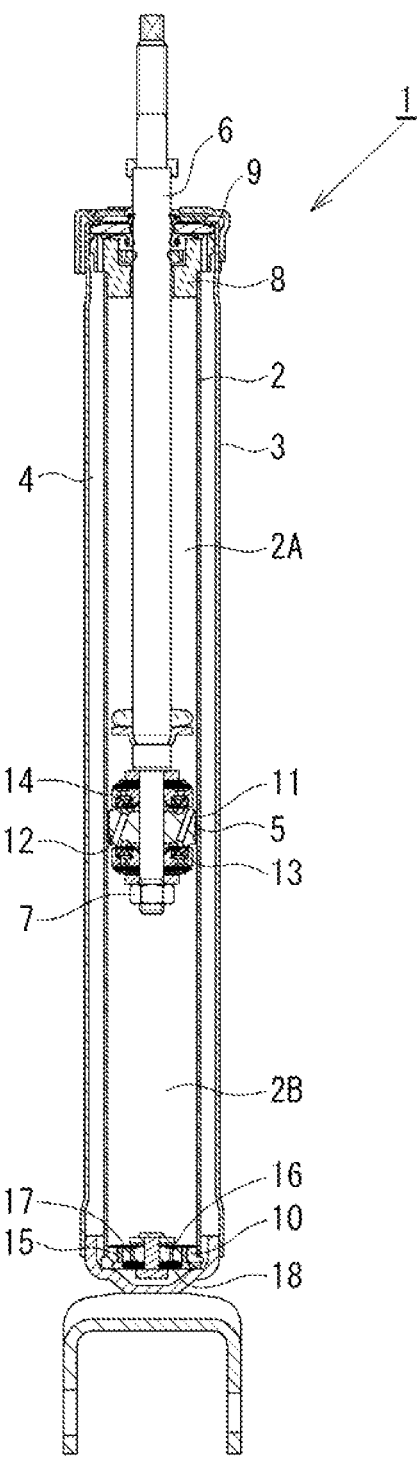
FIG. 2 is a vertical sectional view of the shock absorber shown in FIG. 1.
Figure 3:
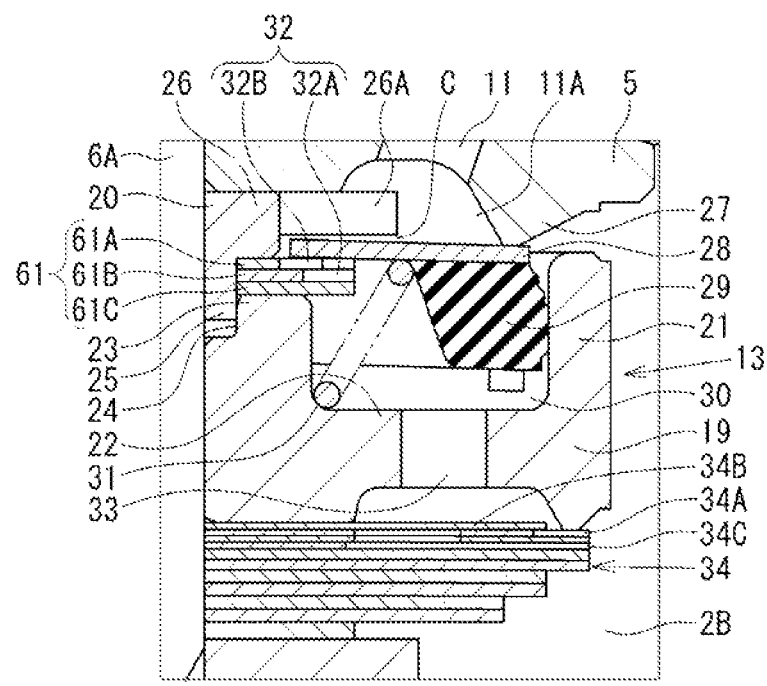
FIG. 3 is an enlarged vertical sectional view of an extension damping force generating mechanism of the shock absorber shown in FIG. 1.

A first embodiment of the present invention will be explained with reference to FIGS. 1 to 4. As shown in FIGS. 1 and 2, a shock absorber 1 according to this embodiment is a dual-tube hydraulic shock absorber. The dual-tube hydraulic shock absorber 1 has a double-tube structure including a cylinder 2 and an outer tube 3 provided around the outer periphery of the cylinder 2 and having an annular reservoir 4 formed between the cylinder 2 and the outer tube 3. A piston 5 is slidably fitted in the cylinder 2. The piston 5 divides the interior of the cylinder 2 into two chambers, i.e. a cylinder upper chamber 2A and a cylinder lower chamber 2B. The piston 5 is connected to a small-diameter portion 6A at one end of a piston rod 6 by a nut 7. The other end portion of the piston rod 6 extends slidably and fluid-tightly through a rod guide 8 and an oil seal 9, which are provided in the upper end portion of the double-tube structure comprising the cylinder 2 and the outer tube 3, and projects to the outside of the cylinder 2. A base valve 10 is provided in the lower end portion of the cylinder 2 to divide the cylinder lower chamber 2B and the reservoir 4 from each other. A hydraulic oil is sealed in the cylinder 2 as a hydraulic fluid, and the hydraulic oil and a gas are sealed in the reservoir 4.

The piston 5 is provided with an extension passage 11 and a compression passage 12 as passages in the embodiment of the present invention, which communicate between the cylinder upper and lower chambers 2A and 2B. The piston 5 is further provided with an extension damping force generating mechanism 13 and a compression damping force generating mechanism 14. The extension damping force generating mechanism 13 generates a damping force by controlling the flow of hydraulic oil from the cylinder upper chamber 2A toward the cylinder lower chamber 2B during the extension stroke of the piston rod 6, during which the cylinder upper chamber 2A serves as an upstream chamber of the extension passage 11 and the cylinder lower chamber 2B as a downstream chamber of the extension passage 11. The compression damping force generating mechanism 14 generates a damping force by controlling the flow of hydraulic oil from the cylinder lower chamber 2B toward the cylinder upper chamber 2A during the compression stroke of the piston rod 6, during which the cylinder lower chamber 2B serves as an upstream chamber of the compression passage 12 and the cylinder upper chamber 2A as a downstream chamber of the compression passage 12.

The base valve 10 is provided with an extension passage 15 and a compression passage 16 that communicate between the cylinder lower chamber 2B and the reservoir 4. The extension passage 15 is provided with a check valve 17 allowing only the flow of hydraulic oil from the reservoir 4 toward the cylinder lower chamber 2B. The compression passage 16 is provided with a compression disk valve 18 generating a damping force by controlling the flow of hydraulic oil from the cylinder lower chamber 2B toward the reservoir 4.

The extension damping force generating mechanism 13 will be explained with reference to FIGS. 1 to 4.

A valve member 19 is disposed at an end of the piston 5 that is closer to the cylinder lower chamber 2B. The valve member 19 has a retaining member 20 attached thereto. The valve member 19 is in the shape of a circular cylinder, one end of which is closed. That is, the valve member 19 has a circular cylindrical portion 21 and a bottom portion 22. The bottom portion 22 has a circular cylindrical mount portion 23 standing on the inner side thereof. The mount portion 23 is concentric with and smaller in diameter than the cylindrical portion 21. The mount portion 23 has an enlarged-diameter portion 24 at the inner side of the distal end thereof. The retaining member 20 has a circular cylindrical portion 25 and an outer flange portion 26 provided on one end of the cylindrical portion 25. Thus, the retaining member 20 has a convex shape. The cylindrical portion 25 is press-fitted into the enlarged-diameter portion 24 of the mount portion 23 of the valve member 19, thereby securing the retaining member 20 to the valve member 19. During assembly, the small-diameter portion 6A of the piston rod 6 is inserted into the mount portion 23 and the cylindrical portion 25, and the nut 7 is screwed onto the distal end of the small-diameter portion 6A and tightened, whereby the valve member 19 and the retaining member 20, which is attached to the valve member 19, are secured to the piston 5 in a state where the retaining member 20 abuts against the end surface of the piston 5. The outer peripheral portion of the outer flange portion 26 of the retaining member 20 is provided with one or a plurality of circumferentially spaced cut portions 26A.

The retaining member 20 has a stepped portion 60 formed at the base of the cylindrical portion 25. The stepped portion 60 has a larger diameter than the cylindrical portion 25. The cylindrical portion 25 has an annular support member 61 fitted thereon. By press-fitting the cylindrical portion 25 into the enlarged-diameter portion 24 of the valve member 19, the support member 61 is clamped between the distal end of and the stepped portion 60 of the cylindrical portion 25 and the mount portion 23 of the valve member 19. In this embodiment, the support member 61 comprises a stack of three annular disks 61A, 61B and 61C (see FIG. 3). The annular disks 61A, 61B and 61C are centered by the cylindrical portion 25 and clamped between the stepped portion 60 and the mount portion 23 into an integral unit. Thus, a support groove 62 having a predetermined groove width (axial length) is formed between the outer flange portion 26 of the retaining member 20 and the support member 61.

The piston 5 has an annular seat portion 27 projecting from the outer periphery of an end surface thereof closer to the cylinder lower chamber 2B. The seat portion 27 serves as a valve seat. The extension passage 11 opens at the inner side of the seat portion 27. The projection height of the seat portion 27 is greater than the thickness of the outer flange portion 26 of the retaining member 20 secured to the piston 5. The seat portion 27 projects more than the outer flange portion 26. A relief valve 28 is an annular disk valve having an outer peripheral portion on the front side thereof. The outer peripheral portion on the front side of the relief valve 28 seats on the seat portion 27. An annular elastic seal member 29 is fixed to an outer peripheral portion of the rear side of the relief valve 28. The outer peripheral portion of the elastic seal member 29 slidably and liquid-tightly abuts against the inner peripheral surface of the cylindrical portion 21 of the valve member 19 to define a back pressure chamber 30 inside the valve member 19.

An inner peripheral portion of the relief valve 28 is inserted into the support groove 62 formed between the outer flange portion 26 of the retaining member 20 and the support member 61. The groove width of the support groove 62 is greater than the plate thickness of the relief valve 28. The relief valve 28 is supported in the support groove 62 in the state of being pressed against the support member 61. Thus, a gap C (see FIG. 3) is formed between the relief valve 28 and the outer flange portion 26 of the retaining member 20. A valve spring 31 as a spring member made of a tapered compression coil spring is interposed between the relief valve 28 and the bottom portion 22 of the valve member 19. The valve spring 31 urges the relief valve 28 in the valve closing direction by the spring force thereof. It should be noted that the spring force of the valve spring 31 is set so that the relief valve 28 is surely seated on the seat portion 27 in view of friction between the elastic seal member 29 of the relief valve 28 and the cylindrical portion 21 of the valve member 19, the valve opening characteristics of the relief valve 28, and so forth.

The support member 61 is provided with a back pressure introducing passage 32 connecting together the back pressure chamber 30 and a port chamber 11A (communicating with the extension passage 11) that is an annular space at the inner peripheral side of the seat portion 27. The back pressure introducing passage 32 is provided with a back pressure introducing orifice 32A having an always constant flow path area. The term "an always constant flow path area", as used herein, means that the flow path area is constant regardless of whether the relief valve 28 is open or closed, i.e. whether the relief valve 28 unseats from or seats on the seat portion 27. In this embodiment, the back pressure introducing passage 32 comprises a hole 32B (a round hole, a slot, or other appropriately-shaped hole) provided in a radially intermediate portion of the disk 61A constituting the support member 61 and a back pressure introducing orifice 32A that is a cut portion formed in an outer peripheral portion of the disk 61B so as to communicate with the hole 32B. The back pressure introducing passage 32 communicates with the port chamber 11A through the support groove 62 and the cut portions 26A.

Figure 4:
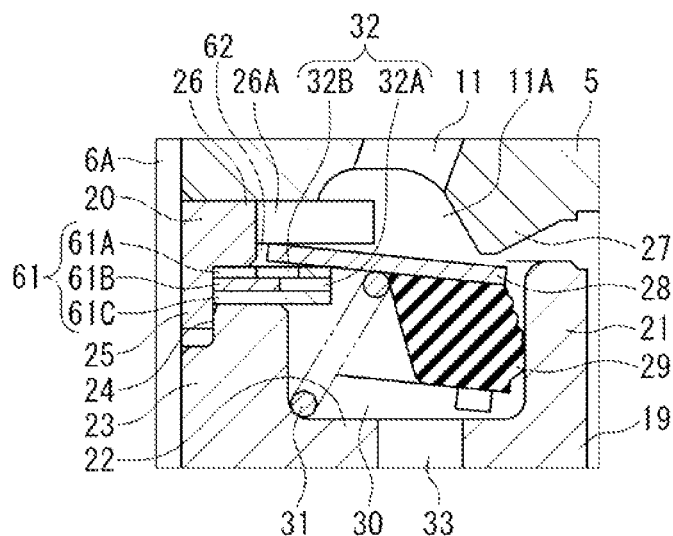
FIG. 4 is a vertical sectional view showing the extension damping force generating mechanism of the shock absorber in FIG. 1 when a main valve of the extension damping force generating mechanism is open.

Upon receiving the pressure in the port chamber 11A communicating with the extension passage 11, the relief valve 28, as shown in FIG. 4, bends on the outer peripheral edge of the support member 61, with the outer peripheral edge serving as a fulcrum, and thus unseats from the seat portion 27. Consequently, the relief valve 28 opens to allow the port chamber 11A to communicate directly with the cylinder lower chamber 2B. At this time, the pressure in the back pressure chamber 30 and the spring force of the valve spring 31 act on the relief valve 28 in the valve closing direction. In addition, when the relief valve 28 opens, as shown in FIG. 4, the inner peripheral edge portion of the relief valve 28 moves within the gap C pivotally about the outer peripheral edge of the support member 61 as a fulcrum. Therefore, the relief valve 28 has substantially no change in its cross-sectional configuration, and the flexural rigidity has only a small influence on the opening of the relief valve 28. Accordingly, the valve opening characteristics of the relief valve 28 depend mainly on the pressure in the back pressure chamber 30 and the spring force of the valve spring 31.

The bottom portion 22 of the valve member 19 is provided with a passage 33 for communication between the back pressure chamber 30 and the cylinder lower chamber 2B. The outer side of the bottom portion 22 is provided with a damping valve 34 selectively opening and closing the passage 33. The damping valve 34 is a normally-closed disk valve that is opened by the pressure in the back pressure chamber 30 to adjust the flow path area between the back pressure chamber 30 and the cylinder lower chamber 2B according to the degree of opening thereof. The damping valve 34 is provided with a downstream orifice 34A constantly communicating between the back pressure chamber 30 and the cylinder lower chamber 2B. The flow path area of the downstream orifice 34A is smaller than that of the back pressure introducing orifice 32A.

The damping valve 34 is further provided with a back pressure check valve 34B allowing only the flow of hydraulic oil from the cylinder lower chamber 2B toward the back pressure chamber 30. The flow path area of the back pressure check valve 34B is restricted to a fixed flow path area by a back pressure orifice 34C. The damping valve 34 comprises a plurality of stacked disks. The downstream orifice 34A, the back pressure check valve 34B and the back pressure orifice 34C are formed by providing cut portions, holes or the like to be passages in the disks constituting the damping valve 34.

Next, the compression damping force generating mechanism 14 will be explained with reference mainly to FIG. 1.

The structure of the compression damping force generating mechanism 14 is similar to that of the above-described extension damping force generating mechanism 13. That is, a valve member 35 is disposed at an end of the piston 5 that is closer to the cylinder upper chamber 2A. The valve member 35 has a retaining member 36 attached thereto. The valve member 35 is in the shape of a circular cylinder, one end of which is closed. That is, the valve member 35 has a circular cylindrical portion 37 and a bottom portion 38. The bottom portion 38 has a mount portion 39 standing thereon. The mount portion 39 has an enlarged-diameter portion 40 on the inner periphery of the distal end thereof. The retaining member 36 has a circular cylindrical portion 41 and an outer flange portion 42 provided on one end of the cylindrical portion 41. Thus, the retaining member 36 has a convex shape. The cylindrical portion 41 is press-fitted into the enlarged-diameter portion 40 of the mount portion 39 of the valve member 35, thereby securing the retaining member 36 to the valve member 35. During assembly, the small-diameter portion 6A of the piston rod 6 is inserted into the mount portion 39 and the cylindrical portion 41, and the nut 7 is tightened, whereby the valve member 35 and the retaining member 36 are secured to the piston 5 in a state where the retaining member 36 abuts against the end surface of the piston 5. The outer peripheral portion of the outer flange portion 42 of the retaining member 36 is provided with one or a plurality of circumferentially spaced cut portions 42A.

The retaining member 36 has a stepped portion 63 formed at the base of the cylindrical portion 41. The stepped portion 63 has a larger diameter than the cylindrical portion 41. The cylindrical portion 41 has an annular support member 64 fitted thereon. By press-fitting the cylindrical portion 41 into the enlarged-diameter portion 40 of the valve member 35, the support member 64 is clamped between the cylindrical portion 41 and the stepped portion 63, and the mount portion 39 of the valve member 35. In this embodiment, the support member 64 comprises a stack of three annular disks in the same way as in the above-described extension damping force generating mechanism 13. The annular disks are clamped between the cylindrical portion 41, the stepped portion 63 and the mount portion 39 into an integral unit. Thus, a support groove 65 having a predetermined groove width (axial length) is formed between the outer flange portion 42 of the retaining member 36 and the support member 64.

The piston 5 has an annular seat portion 43 projecting from the outer periphery of an end surface thereof closer to the cylinder upper chamber 2A. The seat portion 43 serves as a valve seat. The projection height of the seat portion 43 is greater than the thickness of the outer flange portion 42 of the retaining member 36 secured to the piston 5. The seat portion 43 projects more than the outer flange portion 42. The compression passage 12 opens at the inner side of the seat portion 43. A relief valve 44 is an annular disk valve having an outer peripheral portion on the front side thereof. The outer peripheral portion on the front side of the relief valve 44 seats on the seat portion 43. An annular elastic seal member 45 is fixed to an outer peripheral portion of the rear side of the relief valve 44. The outer peripheral portion of the elastic seal member 45 slidably and liquid-tightly abuts against the inner peripheral surface of the cylindrical portion 37 of the valve member 35 to define a back pressure chamber 46 inside the valve member 35.

An inner peripheral portion of the relief valve 44 is inserted into the support groove 65 formed between the outer flange portion 42 of the retaining member 36 and the support member 64. The groove width of the support groove 65 is greater than the plate thickness of the relief valve 44. The relief valve 44 is supported in the support groove 65 in the state of being pressed against the support member 64. Thus, a gap is formed between the relief valve 44 and the outer flange portion 42 of the retaining member 36. A valve spring 47 as a spring member made of a tapered compression coil spring is interposed between the relief valve 44 and the bottom portion 38 of the valve member 35. The valve spring 47 urges the relief valve 44 in the valve closing direction by the spring force thereof. It should be noted that the spring force of the valve spring 47 is set so that the relief valve 44 is surely seated on the seat portion 43, as in the case of the above-described extension damping force generating mechanism 13.

The support member 64 is provided with a back pressure introducing passage 48 connecting together the back pressure chamber 46 and a port chamber 12A (communicating with the compression passage 12) that is an annular space at the inner peripheral side of the seat portion 43. The back pressure introducing passage 48 is provided with a back pressure introducing orifice 48A having an always constant flow path area. The term "an always constant flow path area", as used herein, means that the flow path area is constant regardless of whether the relief valve 44 is open or closed. In this embodiment, the back pressure introducing passage 48 and the back pressure introducing orifice 48A comprise a hole and a cut portion, respectively, provided in the disks constituting the support member 64 and communicate with the port chamber 12A through the support groove 65 and the cut portions 42A, in the same way as in the above-described extension damping force generating mechanism 13.

The bottom portion 38 of the valve member 35 is provided with a passage 49 for communication between the back pressure chamber 46 and the cylinder upper chamber 2A. The outer side of the bottom portion 38 is provided with a damping valve 50 selectively opening and closing the passage 49. The damping valve 50 is a normally-closed disk valve that is opened by the pressure in the back pressure chamber 46 to adjust the flow path area between the back pressure chamber 46 and the cylinder upper chamber 2A according to the degree of opening thereof. The damping valve 50 is provided with a downstream orifice 50A constantly communicating between the back pressure chamber 46 and the cylinder upper chamber 2A. The flow path area of the downstream orifice 50A is smaller than that of the back pressure introducing orifice 48A.

The damping valve 50 is further provided with a back pressure check valve 50B allowing only the flow of hydraulic oil from the cylinder upper chamber 2A toward the back pressure chamber 46. The flow path area of the back pressure check valve 50B is restricted to a fixed flow path area by a back pressure orifice 50C. The damping valve 50 comprises a plurality of stacked disks. The downstream orifice 50A, the back pressure check valve 508 and the back pressure orifice 50C are formed by providing cut portions, holes or the like to be passages in the disks constituting the damping valve 50.

The following is an explanation of the operation of this embodiment arranged as stated above.

During the extension stroke of the piston rod 6, the sliding movement of the piston 5 in the cylinder 2 causes the hydraulic oil in the cylinder upper chamber 2A to be pressurized, and the pressurized hydraulic oil flows toward the cylinder lower chamber 2B through the extension passage 11 of the piston 5. Thus, a damping force is generated mainly by the extension damping force generating mechanism 13. At this time, an amount of hydraulic oil corresponding to the amount by which the piston rod 6 withdraws from the cylinder 2 flows into the cylinder lower chamber 2B from the reservoir 4 by opening the check valve 17 for the extension passage 15 of the base valve 10, and the gas in the reservoir 4 expands correspondingly, thereby compensating for a volumetric change of the hydraulic oil in the cylinder 2.

In the extension damping force generating mechanism 13, the hydraulic oil flows as follows. Before the relief valve 28 opens, the hydraulic oil flows from the extension passage 11, i.e. the port chamber 11A, toward the cylinder lower chamber 2B through the back pressure introducing passage 32 (back pressure introducing orifice 32A), the back pressure chamber 30, the passage 33 and the damping valve 34. When the relief valve 28 is open, the hydraulic oil flows from the port chamber 11A directly into the cylinder lower chamber 2B.

During the extension stroke, when the piston speed is in a very low speed region, neither the relief valve 28 nor the damping valve 34 opens, and the downstream orifice 34A generates a damping force of orifice characteristics (the damping force is approximately proportional to the square of the piston speed).

When the piston speed increases to reach a low speed region, the pressure in the back pressure chamber 30 increases owing to the difference in flow path area between the back pressure introducing orifice 32A and the downstream orifice 34A, causing the damping valve 34 to open. Consequently, a damping force having the valve characteristics of the damping valve 34 is generated (the damping force is approximately proportional to the piston speed), and the slope of the damping force characteristic curve becomes gentle. At this time, the opening of the damping valve 34 causes a temporary reduction in pressure in the back pressure chamber 30. However, as the piston speed increases, the pressure in the back pressure chamber 30 increases again owing to the difference in flow path area between the back pressure introducing orifice 32A and the damping valve 34. Accordingly, the relief valve 28 is kept closed by the pressure in the back pressure chamber 30 until the piston speed reaches an intermediate speed region.

When the piston speed further increases to reach a high speed region, the differential pressure between the port chamber 11A and the back pressure chamber 30 reaches the valve opening pressure of the relief valve 28 owing to the restriction by the back pressure introducing orifice 32A, and the relief valve 28 unseats from the seat portion 27 to open against the spring force of the valve spring 31. The opening of the relief valve 28 generates a damping force having the valve characteristics of the relief valve 28. Consequently, the slope of the damping force characteristic curve is made even gentler to suppress an excessive increase of damping force in the high piston speed region. After the relief valve 28 has opened, the hydraulic oil in the port chamber 11A flows out through two different paths. That is, one part of the hydraulic oil flows directly into the cylinder lower chamber 2B, and another part of the hydraulic oil flows into the back pressure chamber 30 through the back pressure introducing orifice 32A. The degree of opening of the relief valve 28 is determined by the pressure balance between the port chamber 11A and the back pressure chamber 30. Thus, the relief valve 28 is kept open without being suddenly closed by an increase in pressure in the back pressure chamber 30. Therefore, a stable damping force of valve characteristics can be obtained.

During the compression stroke of the piston rod 6, the sliding movement of the piston 5 in the cylinder 2 causes the hydraulic oil in the cylinder lower chamber 2B to be pressurized, and the pressurized hydraulic oil flows toward the cylinder upper chamber 2A through the compression passage 12 of the piston 5. Thus, a damping force is generated mainly by the compression damping force generating mechanism 14. At this time, an amount of hydraulic oil corresponding to the amount by which the piston rod 6 enters the cylinder 2 flows into the reservoir 4 by opening the disk valve 18 for the compression passage 16 of the base valve 10 and compresses the gas in the reservoir 4, thereby compensating for a volumetric change of the hydraulic oil in the cylinder 2.

In the compression damping force generating mechanism 14, the hydraulic oil flows as follows. Before the relief valve 44 opens, the hydraulic oil flows from the compression passage 12, i.e. the port chamber 12A, toward the cylinder upper chamber 2A through the hack pressure introducing passage 48 (back pressure introducing orifice 48A), the back pressure chamber 46, the passage 49 and the damping valve 50. When the relief valve 44 is open, the hydraulic oil flows from the port chamber 12A directly into the cylinder upper chamber 2A.

During the compression stroke, when the piston speed is in a very low speed region, neither the relief valve 44 nor the damping valve 50 opens, and the downstream orifice 50A generates a damping force of orifice characteristics (the damping force is approximately proportional to the square of the piston speed), as in the case of the above-described extension damping force generating mechanism 13.

When the piston speed increases to reach a low speed region, the pressure in the back pressure chamber 46 increases owing to the difference in flow path area between the back pressure introducing orifice 48A and the downstream orifice 50A, causing the damping valve 50 to open. Consequently, a damping force having the valve characteristics of the damping valve 50 is generated (the damping force is approximately proportional to the piston speed), and the slope of the damping force characteristic curve becomes gentle. At this time, the opening of the damping valve 50 causes a temporary reduction in pressure in the back pressure chamber 46. However, as the piston speed increases, the pressure in the back pressure chamber 46 increases again owing to the difference in flow path area between the back pressure introducing orifice 48A and the damping valve 50. Accordingly, the relief valve 44 is kept closed by the pressure in the back pressure chamber 46 until the piston speed reaches an intermediate speed region.

When the piston speed further increases to reach a high speed region, the differential pressure between the port chamber 12A and the back pressure chamber 46 reaches the valve opening pressure of the relief valve 44 owing to the restriction by the back pressure introducing orifice 48A, and the relief valve 44 unseats from the seat portion 43 to open against the spring force of the valve spring 47. The opening of the relief valve 44 generates a damping force having the valve characteristics of the relief valve 44. Consequently, the slope of the damping force characteristic curve is made even gentler to suppress an excessive increase of damping force in the high piston speed region. After the relief valve 44 has opened, the hydraulic oil in the port chamber 12A flows out through two different paths. That is, one part of the hydraulic oil flows directly into the cylinder upper chamber 2A, and another part of the hydraulic oil flows into the back pressure chamber 46 through the back pressure introducing orifice 48A. The degree of opening of the relief valve 44 is determined by the pressure balance between the port chamber 12A and the back pressure chamber 46. Thus, the relief valve 44 is kept open without being suddenly closed by an increase in pressure in the back pressure chamber 46. Therefore, a stable damping force of valve characteristics can be obtained.

Figure 6:
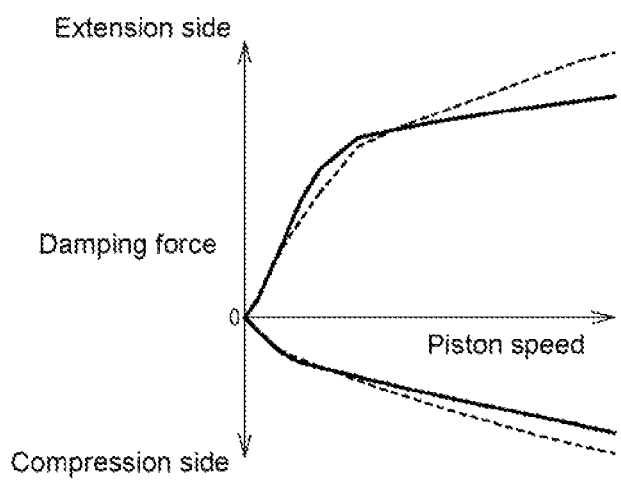
FIG. 6 is a graph showing damping force characteristics of the shock absorber shown in FIG. 1.

Thus, the damping valve 34 (50) and the relief valve 28 (44) are opened successively as the piston speed increases, thereby allowing desired damping force characteristics to be obtained over the entire piston speed range from the very low speed region to the high speed region. As a result, the shock absorber 1 exhibits damping force characteristics as shown by the solid lines in FIG. 6. That is, in the low and intermediate piston speed regions, the damping force characteristic curve rises sharply to provide the required damping force. In the high piston speed region, the slope of the damping force characteristic curve is made gentle to suppress an excessive increase of damping force, thereby obtaining damping force characteristics suitable for improving the vehicle steering stability and ride quality. It should be noted that the broken lines in FIG. 6 show damping force characteristics of a conventional hydraulic shock absorber having a back pressure chamber arranged as disclosed in Japanese Patent Publication No. 2006-10069.

When the relief valve 28 (44) opens, the inner peripheral edge portion thereof moves within the gap C pivotally about the outer peripheral edge of the support member 61 (64) as a fulcrum. Consequently, the flexural rigidity has only a small influence on the opening of the relief valve 28 (44), and the valve opening characteristics of the relief valve 28 (44) depend mainly on the pressure in the back pressure chamber 30 (46) and the spring force of the valve spring 31 (47). Accordingly, it is possible to increase the degree of freedom for setting the valve opening pressure of the relief valve 28 (44) and to reduce the slope of the damping force characteristic curve in the intermediate and high piston speed regions. Thus, desired damping force characteristics can be obtained. In addition, the back pressure introducing passage 32 (48) and the back pressure introducing orifice 32A (48A) are provided in the support member 61 (64), which is discrete from the relief valve 28 (44), and the flow path area thereof is always constant regardless of whether the relief valve 28 (44) is open or closed. Therefore, stable damping force characteristics can be obtained.

During assembly of the shock absorber 1, the relief valve 28 (44), the valve spring 31 (47) and the support member 61 (64) are installed in the valve member 19 (35), and the retaining member 20 (36) is press-fitted into the mount portion 23 (39), thereby allowing these components to be subassembled. Accordingly, even if the valve spring 31 (47) is long in free length, these components can be retained in the state of being incorporated in the valve member 19 (35). Thus, assembleability can be improved.

During the subassembling process, the elastic seal member 29 is fixed to the relief valve 28, and thus the relief valve 28 is centered.

In the present invention, however, the elastic seal member 29 need not necessarily be fixed to the relief valve 28 but may be discrete from the relief valve 28. It is also possible to replace the elastic seal member 29 with a metallic seal ring having an outer peripheral surface in sliding contact with the inner periphery of the cylindrical portion 21 and abutting against the relief valve 28.

The following is an explanation of the operation of the compression damping force generating mechanism 14 during the extension stroke and the operation of the extension damping force generating mechanism 13 during the compression stroke.

During the extension stroke of the piston rod 6, in the compression damping force generating mechanism 14, the back pressure check valve 50B of the damping valve 50 opens to introduce the pressure in the cylinder upper chamber 2A into the back pressure chamber 46 through the back pressure orifice 50C. Consequently, the back pressure chamber 46 can be maintained in a pressurized state to prevent the relief valve 44 from opening and to allow the pressure in the back pressure chamber 46 to be increased rapidly when the piston rod stroke changes to the compression stroke. Thus, stable damping force can be generated.

During the compression stroke of the piston rod 6, in the extension damping force generating mechanism 13, the back pressure check valve 34B of the damping valve 34 opens to introduce the pressure in the cylinder lower chamber 2B into the back pressure chamber 30 through the back pressure orifice 34C. Thus, the back pressure chamber 30 can be maintained in a pressurized state. Consequently, the relief valve 28 can be prevented from opening, and the pressure in the back pressure chamber 30 can be increased rapidly when the piston rod stroke changes to the extension stroke. Thus, stable damping force can be generated.

Figure 5:
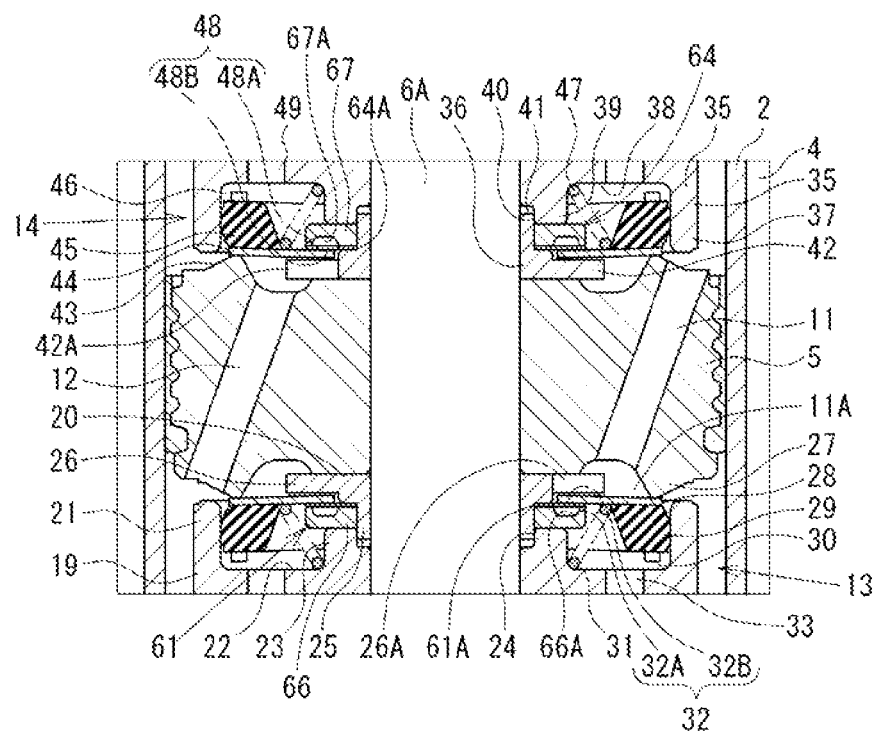
FIG. 5 is an enlarged vertical sectional view showing a main part of a shock absorber according to a second embodiment of the present invention.

Next, a second embodiment of the present invention will be explained with reference mainly to FIG. 5. In the following explanation, only a main part of the second embodiment will be illustrated. Members or portions of the second embodiment similar to those of the foregoing first embodiment are denoted by the same reference numerals as used in the first embodiment, and only the points in which the second embodiment differs from the first embodiment will be explained in detail.

In the second embodiment, the extension and compression damping force generating mechanisms 13 and 14 are arranged as follows. As shown in FIG. 5, the support member 61 of the extension damping force generating mechanism 13 (the support member 64 of the compression damping force generating mechanism 14) comprises an annular member 66 (67) and one disk 61A (64A) superimposed on one end of the annular member 66 (67). The annular member 66 (67) has an annular groove 66A (67A) formed in the one end thereof. The annular groove 66A (67A) communicates with the port chamber 11A (12A) through the hole 32B (48B) in the disk 61A (64A). The annular member 66 (67) has a cut portion formed in an outer peripheral edge portion thereof. The cut portion forms a back pressure introducing orifice 32A (48A) between the outer peripheral edge portion of the annular member 66 (67) and the disk 61A (64A). The back pressure introducing orifice 32A (48A) has an always constant flow path area to communicate between the annular groove 66A (67A) and the back pressure chamber 30 (46). The hole 32B (48B), the annular groove 66A (67A) and the back pressure introducing orifice 32A (48A) form a back pressure introducing passage 32 (48) connecting between the port chamber 11A (12A), and the back pressure chamber 30 (46). It should be noted that the cut portions forming the back pressure introducing orifices 32A and 48A of the annular members 66 and 67 can be formed easily by coining or the like. Thus, the second embodiment offers advantageous effects similar to those of the foregoing first embodiment.

Although in the foregoing first and second embodiments a damping force generating mechanism having a back pressure chamber is provided for each of the extension and compression sides, the damping force generating mechanism may be provided for either one of the extension and compression sides. Although in the foregoing first and second embodiments the present invention is explained as being applied to a dual-tube shock absorber having the reservoir 4, the present invention is not limited thereto but may be applied to a single-tube shock absorber having a gas chamber formed in a cylinder by a free piston. Although the damping force generating mechanism is provided in the piston assembly in the foregoing embodiments, the present invention is not limited thereto. The damping force generating mechanism may be provided in any other part of the shock absorber where a flow of hydraulic fluid is induced by the piston rod stroke, for example, outside the cylinder. Further, the hydraulic fluid is not limited to hydraulic oil but may be a gas. In such a case, the reservoir 4, the base valve 10, the free piston, and so forth are unnecessary.

Although in the foregoing first and second embodiments the valve springs 31 and 47 are used to urge the relief valves 28 and 44 in the valve closing direction by the spring force thereof, the valve springs 31 and 47 may be omitted. The use of the valve springs 31 and 47, however, enables the relief valves 28 and 44 to open and close even more stably.

The shock absorber according to the present invention has an increased degree of freedom for setting damping force characteristics to obtain desired damping force characteristics.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present claims priority under 35 U.S.C. section 119 to Japanese Patent No. 2010-042473 filed on Feb. 26, 2010.

The entire disclosure of Japanese Patent No. 2010-042473 filed on Feb. 26, 2010 including specification, claims, drawings and summary is incorporated herein by reference in its entirety.

What is claimed is:

1. A shock absorber comprising:
   a cylinder having a hydraulic fluid sealed therein;
   a piston slidably fitted in the cylinder;
   a piston rod connected to the piston and extending to an outside of the cylinder;
   a passage through which a flow of the hydraulic fluid is induced by movement of the piston;
   a relief valve adapted to restrict the flow of the hydraulic fluid through the passage;
   a back pressure chamber adapted to apply a pressure therein to the relief valve in a direction for closing the relief valve; and
   a back pressure introducing passage adapted to introduce the hydraulic fluid into the back pressure chamber;
   the relief valve being an annular disk valve having an opening at an inner side thereof;
   the relief valve having a front side and a rear side, the back pressure chamber being disposed at the rear side;
   the relief valve comprising:
   an outer peripheral portion provided on the front side, the outer peripheral portion adapted to unseat from and seat on a valve seat to open and close, respectively, the relief valve;
   an inner peripheral portion supported from the rear side by a support member; and
   an inner peripheral edge portion adjacent to the opening at the inner side;
   wherein, when the outer peripheral portion of the relief valve seats on the valve seat to close the relief valve, a gap is provided between the front side of the relief valve and a retaining member adapted to retain the support member, and when the outer peripheral portion of the relief valve unseats from the valve seat to open the relief valve, the inner peripheral edge portion moves within the gap pivotally about the support member as a fulcrum,
   wherein the inner peripheral edge portion of the relief valve is located at an inner side of the fulcrum, and
   wherein the back pressure introducing passage comprises a back pressure introducing orifice which is provided in the support member and which has a flow path area, the flow path area of the back pressure introducing orifice being constant regardless of whether the relief valve is open or closed, thereby enabling the hydraulic fluid to be introduced into the back pressure chamber through the inner side opening of the relief valve and the back pressure introducing orifice.

2. The shock absorber of claim 1, wherein the relief valve has an elastic seal member integrally fixed to an outer peripheral portion of the rear side to seal the back pressure chamber.

3. The shock absorber of claim 1, wherein the support member is provided with the back pressure introducing passage.

4. The shock absorber of claim 2, wherein the support member is provided with the back pressure introducing passage.

5. The shock absorber of claim 1, wherein the rear side of the relief valve is provided with a spring member urging the relief valve in the direction for closing the relief valve.

6. The shock absorber of claim 2, wherein the rear side of the relief valve is provided with a spring member urging the relief valve in the direction for closing the relief valve.

7. The shock absorber of claim 3, wherein the rear side of the relief valve is provided with a spring member urging the relief valve in the direction for closing the relief valve.

8. The shock absorber of claim 1, further comprising:
a valve member having a shape of a circular cylinder, one end of which is closed, the valve member defining the back pressure chamber;
the retaining member being fitted to the valve member, with the relief valve and the support member incorporated in the valve member, to form a subassembly.

9. The shock absorber of claim 2, further comprising:
a valve member having a shape of a circular cylinder, one end of which is closed, the valve member defining the back pressure chamber;
the retaining member being fitted to the valve member, with the relief valve and the support member incorporated in the valve member, to form a subassembly.

10. The shock absorber of claim 3, further comprising:
a valve member having a shape of a circular cylinder, one end of which is closed, the valve member defining the back pressure chamber;
the retaining member being fitted to the valve member, with the relief valve and the support member incorporated in the valve member, to form a subassembly.

11. The shock absorber of claim 5, further comprising:
a valve member having a shape of a circular cylinder, one end of which is closed, the valve member defining the back pressure chamber;
the retaining member being fitted to the valve member, with the relief valve and the support member incorporated in the valve member, to form a subassembly.

12. The shock absorber of claim 1, wherein the back pressure chamber is provided with a damping valve opened by the pressure in the back pressure chamber to generate a damping force by controlling a flow of the hydraulic fluid toward a downstream chamber.

13. The shock absorber of claim 2, wherein the back pressure chamber is provided with a damping valve opened by the pressure in the back pressure chamber to generate a damping force by controlling a flow of the hydraulic fluid toward a downstream chamber.

14. The shock absorber of claim 3, wherein the back pressure chamber is provided with a damping valve opened by the pressure in the back pressure chamber to generate a damping force by controlling a flow of the hydraulic fluid toward a downstream chamber.

15. The shock absorber of claim 5, wherein the back pressure chamber is provided with a damping valve opened by the pressure in the back pressure chamber to generate a damping force by controlling a flow of the hydraulic fluid toward a downstream chamber.

16. The shock absorber of claim 8, wherein the back pressure chamber is provided with a damping valve opened by the pressure in the back pressure chamber to generate a damping force by controlling a flow of the hydraulic fluid toward a downstream chamber.

* * * * *